Oct. 6, 1942.                A. C. CHAMBERS                 2,297,692
                           FLUID FLYWHEEL CONTROL
                   Filed Aug. 15, 1939            5 Sheets-Sheet 1

INVENTOR.
ALLAN C. CHAMBERS
BY
                ATTORNEY.

INVENTOR.
ALLAN C. CHAMBERS
BY
ATTORNEY.

Oct. 6, 1942.  A. C. CHAMBERS  2,297,692
FLUID FLYWHEEL CONTROL
Filed Aug. 15, 1939  5 Sheets-Sheet 4

INVENTOR.
ALLAN C. CHAMBERS
BY
ATTORNEY.

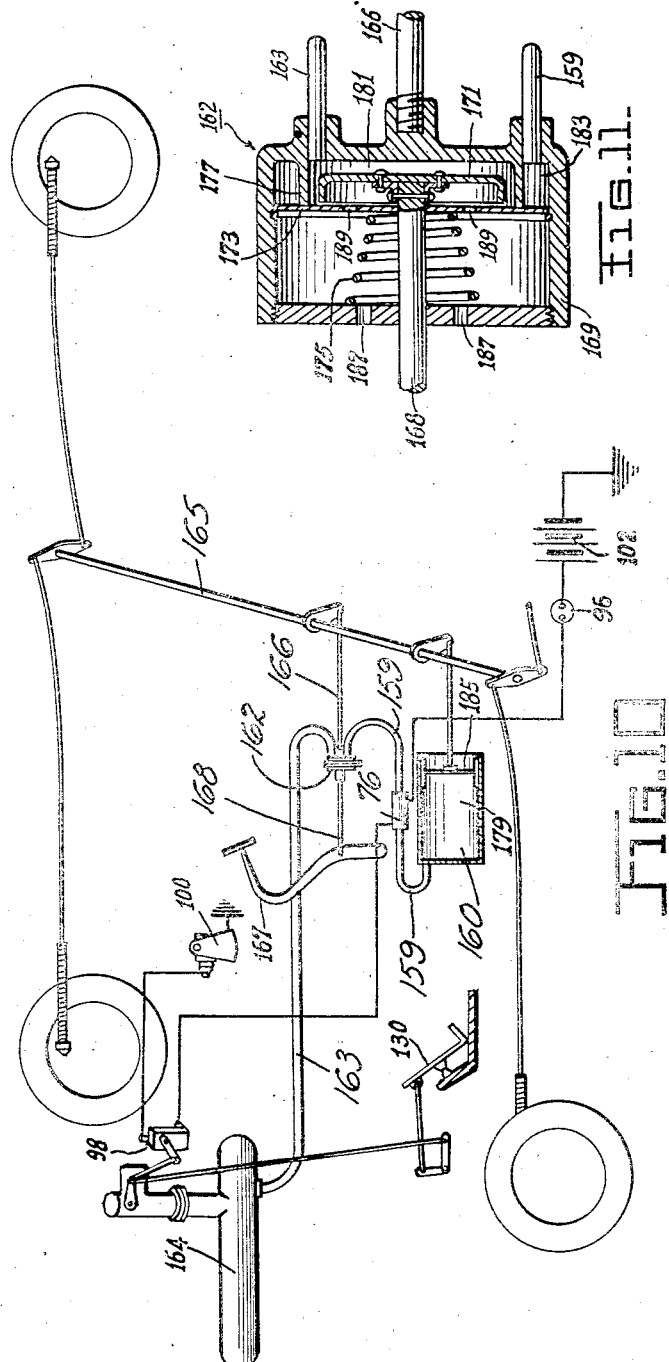

Patented Oct. 6, 1942

2,297,692

UNITED STATES PATENT OFFICE 2,297,692

FLUID FLYWHEEL CONTROL

Allan C. Chambers, Detroit, Mich., assignor to Bendix Aviation Corporation, South Bend, Ind., a corporation of Delaware Application August 15, 1939, Serial No. 290,243

4 Claims. (Cl. 192—3)

This invention relates to the power transmission system of an automotive vehicle, and more particularly to means for controlling a power transmission system including a so-called fluid clutch or fluid flywheel such, for example, as that being incorporated in the Chrysler Custom Imperial.

An object of the invention is to provide means for preventing the aforementioned model of Chrysler automobile from moving either forwardly or backwardly after it has been brought to a stop on level ground.

Another object of the invention is to provide automatically operable means for retaining in applied position the brakes of a motor vehicle equipped with a fluid clutch, a friction clutch and a change-speed transmission, all of conventional design, upon the conclusion of a braking operation when the acceleration is released and the vehicle is stationary upon an incline.

Another object of the invention is to provide automatically operable means for retaining in applied position the brakes of a motor vehicle equipped with a fluid clutch, a friction clutch and a change-speed transmission, all of conventional design, said operation being effected while the vehicle is being decelerated at or below a predetermined rate.

Another object of the invention is to provide automatically operable means for retaining in applied position the brakes of a motor vehicle equipped with a fluid clutch, a friction clutch and a change-speed transmission, all of conventional design, upon the conclusion of a braking operation, when the accelerator is released and when the vehicle is stationary upon a decline not exceeding a predetermined degree.

Yet another object of the invention is to provide a braking system for a motor vehicle having a fluid clutch and other convention controls with means for automatically retaining the brakes of the vehicle in applied position at the conclusion of a braking operation while the vehicle is ascending an incline and in part to control said retaining means by the accelerator of the vehicle so that depression of the accelerator to start the vehicle in motion automatically releases the retaining means.

Yet another object of the invention is to provide, in an automotive vehicle equipped with an internal-combustion engine or other power plant, a fluid clutch, a friction clutch and a manually controlled selective gear transmission, means for maintaining the brakes of the vehicle applied after the vehicle is brought to a stop on level ground or after the vehicle is brought to a stop on an incline.

A further object of my invention is to provide, in an automotive vehicle, a mechanism for dispensing with the operation of the change-speed transmission, at the will of the driver, and with such a control preventing movement of the vehicle after it has been brought to a stop on an incline or on level ground by merely releasing the accelerator and then depressing the brake pedal and immediately thereafter removing the foot therefrom.

Other objects of the invention and desirable details of construction and combinations of parts will become apparent from the following detailed description of certain embodiments of the invention, taken in conjunction with the accompanying drawings illustrating said embodiments, in which:

Figure 10 is a view, similar to Figure 1, disclosing the brake holding mechanism constituting my invention applied to a vacuum brake system, and Figure 11 is a sectional view of the brake pedal operated three-way control valve disclosed in Figure 10.

Figure 1:
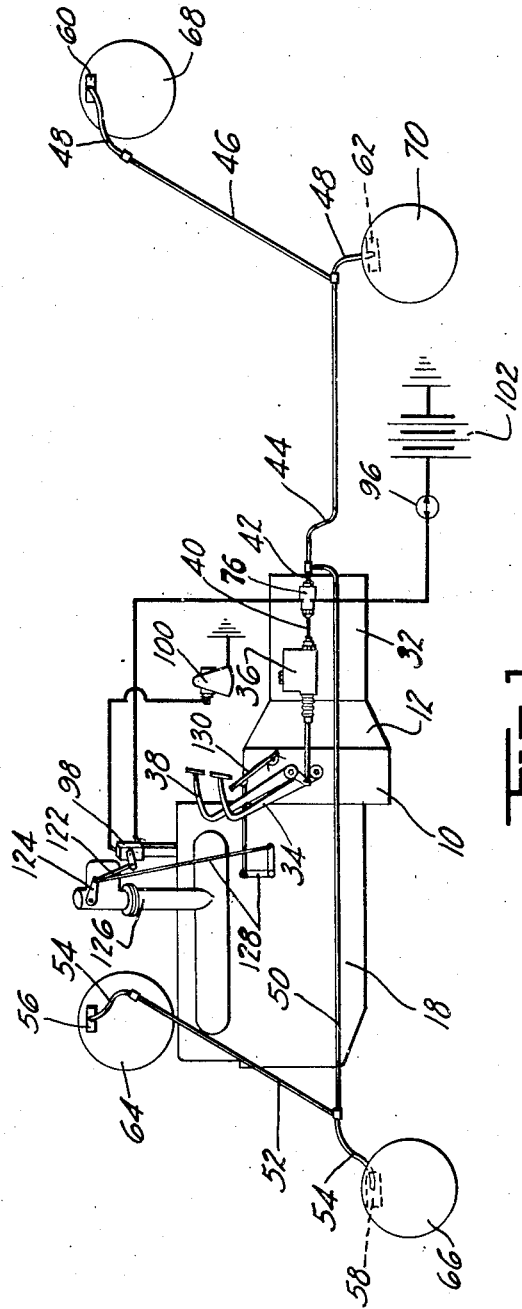
Figure 1 is a diagrammatic view disclosing the principal elements of my invention.
Figure 2:
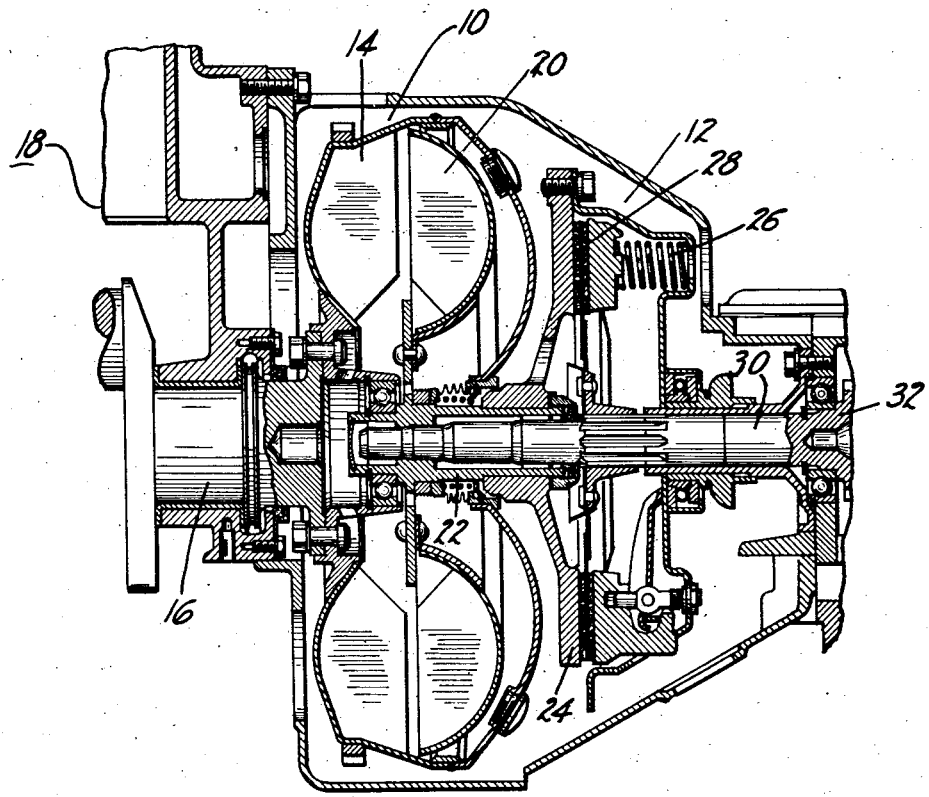
Figure 2 is a sectional view disclosing the fluid clutch and friction clutch now being incorporated in the Chrysler Custom Imperial.

Referring to Figure 1, disclosing schematically a preferred embodiment of my invention, 10 represents a fluid clutch such, for example, as the one now incorporated in the Chrysler Custom Imperial automotive vehicle. Immediately to the rear of this fluid clutch, in the power transmission mechanism of the vehicle, there is incorporated a friction clutch 12, both clutches being disclosed in detail in Figure 2 of the drawings. These clutches are of well-known design, and no claim is made thereto.

Briefly describing the clutches 10 and 12, the fluid clutch 10 includes a rotor or driving element 14, drivably connected by a shaft 16 and other conventional mechanisms, not shown, to the power plant of the vehicle preferably an internal-combustion engine 18. Rotor element 14, which is filled with oil, houses the stator or driven element 20 of the fluid clutch, said latter element being drivably connected by means of a shaft 22 to the rotor or driving element 24 of the friction clutch 12. Clutch springs 26 bias a driven clutch element 28 of the friction clutch into engagement with the driving clutch element 24, the element 28 being connected by means including a shaft 30 with the selective change-speed transmission 32. A clutch pedal 34, when depressed, effects, by suitable connections, a disengagement of the friction clutch 12, that is, a movement of the driven element 28 away from the driving element 24, and a shift lever, not shown, serves to operate the change-speed transmission 32.

The most important part of the various combinations of elements constituting my invention is the mechanism for controlling the operation of the brakes of the vehicle. Describing this mechanism, there is disclosed in Figure 1 a hydraulic brake system of conventional design, said system including a master cylinder 36, the oil therein being subjected to a load when a brake pedal 38 is depressed, said load being transmitted, via the oil in lines 40, 42, 44, 46, 48, 50, 52 and 54 to the wheel cylinders 56, 58, 60 and 62 of the four brakes 64, 66, 68 and 70 respectively of the vehicle. My invention is not limited however to the use of a hydraulic brake system, for, as will be brought out hereinafter, other types of brake systems may be employed.

Figure 3:
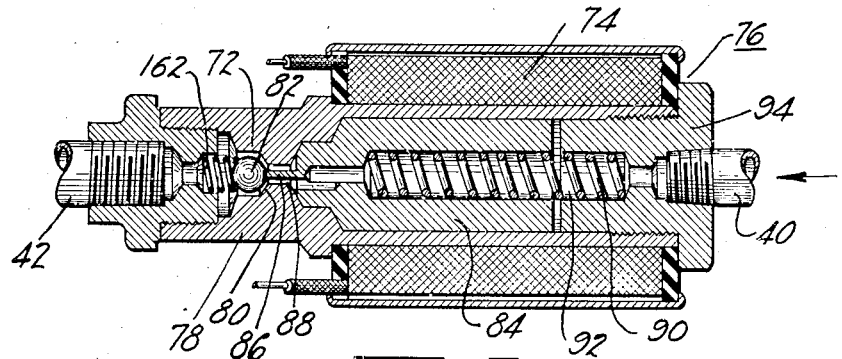
Figure 3 is a view disclosing, in section, the solenoid operated check valve or so-called no-back valve included in the braking system disclosed in Figure 1.
Figures 4, 5:
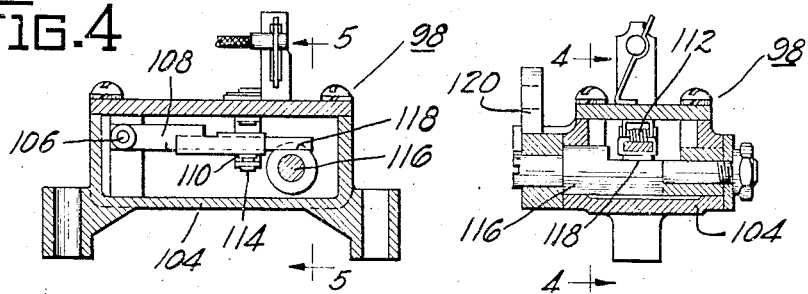
Figure 4 is a sectional view, taken on the line 4—4 of Figure 5, of the accelerator operated breaker switch.
Figure 5 is a sectional view, taken on the line 5—5 of Figure 4, of the accelerator operated breaker switch.

Referring now to Figure 3, there is disclosed therein a check valve or so-called no-back valve 72, which valve is capable of being operated, when and only when a solenoid 74 is energized, to maintain the brakes applied. This valve and its operating means may be defined as a valve unit 76 said unit including a casing 78 bored to provide a seat 80 for a ball check valve member 82. A tubular valve operating member 84, reciprocably mounted within the casing 72, is provided with a stem 86, which projects through a duct 88 and into contact with the ball valve member 82. A compression spring 90, housed within the tubular member 84 and extending within an opening 92 in a plug 94, serves to move or bias the member 84 and the ball valve member 82 to the positions disclosed in Figure 3, the ball at this time being removed from the valve seat 80 to permit the passage of oil through the duct 88. The operation of the solenoid 74 is controlled by an ignition switch 96, an accelerator operated breaker switch 98, disclosed in detail in Figures 4 and 5, and a pendulum operated breaker switch 100, disclosed in Figure 6, said switches being connected in series with a battery 102.

The accelerator operated switch 98 includes a rigidly mounted casing 104 having pivotally mounted therein at 106 a lever member 108 to which is secured a contact member 110. As disclosed in Figure 5, the member 108 is movable by a spring 112 into contact with a contact member 114, and the contacts 110 and 114 may be separated to open the switch by rotating a pin 116. This pin is rotatably mounted in the casing 104 and is provided with a flat portion 118 contactible with the switch operating lever member 108. A crank 120 is secured to the pin 116, to which crank is connected a link 122. The link 122 is connected at its other end to a crank 124 connected to the throttle of the carburetor 126. Linkage 128 serves to interconnect the crank 124 with the accelerator 130 of the vehicle, and the parts of the switch 98 and its operating mechanism are so constructed and arranged that when the accelerator is released to idle the engine the switch is closed. Briefly describing the operation of the switch when the accelerator is released the spring 112 forces the lever 108 downwardly, that is in a clockwise direction, Figure 4, to move the contact 110 into engagement with contact 114; and when the accelerator is depressed to open the throttle the rotation of the pin 116 results in a movement of the edge of flat portion 118 to move the lever member 108 counterclockwise, Figure 4, and open the switch.

Figure 6:
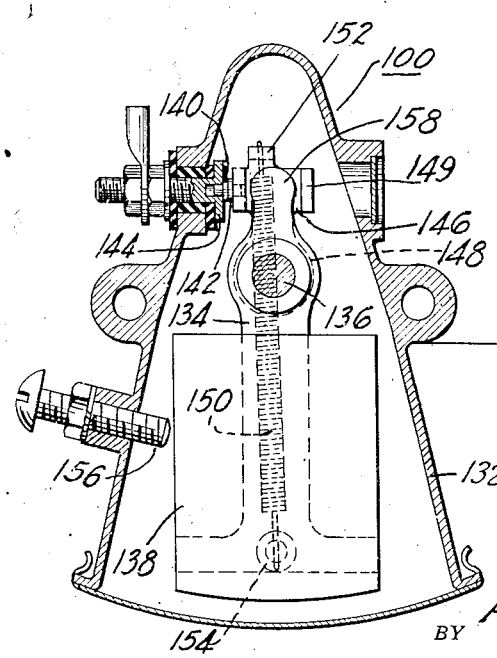
Figure 6 is a sectional view of another breaker switch for in part controlling the operation of the solenoid disclosed in Figure 3, together with the pendulum operated mechanism for operating said switch.

Describing now one of the important features of my invention, namely, the pendulum operated breaker switch 100, there is disclosed in Figure 6 the preferred embodiment of the switch and its operating mechanism. Other embodiments, which will be described hereinafter, are disclosed in Figures 7, 8 and 9. Describing the mechanism disclosed in Figure 6, a rigidly mounted hollow casing 132 serves to house the breaker switch 100 and its operating means. The latter includes a lever 134 pivotally mounted on a pin 136 mounted in the casing 132. To the end of the lever 134 there is fixedly secured a weight or bob 138, said lever with its weighted end constituting a pendulum. The switch 100 comprises contacts 140 and 142 secured respectively to a pin 144 mounted in the casing and to a U-shaped clip 146 secured to the upper end of a lever 148 pivotally mounted on the pin 136. A spring 150 is connected at one of its ends to a tab 152 extending from the clip 146 and at its other end to a projection 154 extending from the weight 138. A stop 156 is adjustably mounted in the casing 132 and serves to prevent the contact 142 from being unduly forced against the contact 140 when the vehicle is accelerated. For when the vehicle is accelerated the pendulum weight 138 will contact the stop 156 before the rounded end 158 of the lever will contact a bent end portion 149 of the clip 146.

Describing the operation of the mechanism constituting my invention, should the driver elect to leave the transmission in gear, when the vehicle is stopped on an incline or on level ground and with the accelerator released, he may do so without disengaging the friction clutch 12. Under these conditions it is necessary, with the mechanism of my invention, that is, the two clutches, the transmission, the brakes and the brake operating and controlling means, to apply the brakes but once. Having depressed the brake pedal the foot may be removed therefrom for the brakes remain applied. Furthermore, the brakes will remain applied, despite release of the brake pedal, either when the vehicle is brought to a stop upon a decline equal to or not exceeding a predetermined degree or when the vehicle is decelerated, as a result of an application of the brakes, at or below a predetermined rate. Under all other conditions, for example, when the accelerator is released and the brakes are applied to severely decelerate the vehicle, the check valve 72 remains inoperative as a result of the operation of the spring 90 and the brakes do not remain applied after the brake pedal is released.

Continuing the description of the operation of the no-back and/or anti-creep mechanism once the brake pedal is depressed the brakes remain applied, for the valve 72 may then, but not until then, be operated. Describing this feature, and referring to Figure 3, when the solenoid 74 is energized by closing the switches 96, 98 and 100, the member 84 is drawn to the right to further compress the spring 90, thereby making possible an operation of the check valve 72. The stem 86 is moved to the right, thus permitting the ball valve member 82 to be seated by the spring. If the brakes are now applied by depressing the brake pedal, the pressure of the brake fluid upon the valve member 82, will move the same to the left to compress a return spring 162 and unseat the valve. In this operation the brake fluid moves to the left, as indicated by the arrow in Figure 3, said fluid entering the member 84 from the conduit 40 connected to the master cylinder 36 and leaving the valve unit 76 by way of the conduit 42, as disclosed in Figure 1. When the brake pedal is released, the force exerted, by the return spring 162 and by the return springs within the wheel cylinders, upon the brake fluid in the system located between the ball valve member 82 and the wheel cylinders results in said member being moved to right to again seat the valve. The brakes are thus locked in their applied position and are not released until the solenoid 74 is again de-energized to render the check valve 72 inoperative. The valve unit 76 of my invention may also be incorporated in a vacuum operated braking system of conventional design disclosed in Figure 10. When so used the unit 76 is incorporated in a conduit 159 interconnecting a vacuum motor 160 and a follow-up three-way valve 162 which controls the operation of the motor. This valve is connected, by a conduit 163, to the intake manifold 164 of the internal combustion engine. Briefly describing the construction of the valve 162 the same includes a casing 169 connected to a brake operating cross-shaft 165 by a link 166 and further includes a valve operating member 171 within the casing, said member being connected to a brake pedal 167 by a link 168.

Describing the operation of the mechanism disclosed in Figures 10 and 11, and incidentally completing the description of the parts of the valve 162 when the brake pedal is depressed to apply the brakes by the operation of the vacuum motor 160, the valve operating member 171 is moved to the left, Figure 11, into engagement with a flexible valve member 173 fitted tightly within the casing 169. The member 163 is normally biased to the right, Figure 11, by a spring 175, to seat upon the periphery of an annular flange 177 extending inwardly from the valve casing 169. Continued movement of the brake pedal to the left, Figure 1, serves to flex the valve member 173, thereby moving the same off its seat upon the flange 177. By this operation the intake manifold is placed in fluid transmitting connection with a compartment 179 of the vacuum motor 169 and the air is thus drawn out of said compartment into the manifold via a conduit 163, compartments 181 and 183 of the valve 162 and conduit 169. The power element of the motor 160, that is a piston 185 is then subjected to a differential of pressures resulting in its being forced to the left, Figure 10, to apply the brakes. In this operation the ball check valve 82, Figure 3, is unseated by virtue of the differential of pressures acting upon the same and remains unseated so long as air is flowing from the motor compartment 179 to the intake manifold, that is so long as the valve 162 is kept opened as above described. Explaining this differential of pressures then acting upon the check valve 82, the gaseous pressure within the motor compartment 179 and the opening 92 in the valve 76 immediately adjacent the check valve 82, is lower than the gaseous pressure to the left of valve 82 when the air is flowing from the vacuum motor to the intake manifold.

Should the driver stop the movement of the brake pedal before the brake is completely applied the valve 162 will automatically lap, that is the valve casing 169, which is connected to the then moving piston 185, will continue to move to the left. The valve member 173 is by this operation again seated tightly upon the flange 177 thereby cutting off the fluid transmitting connection between the intake manifold and the vacuum motor; and when this occurs the movement of the piston 185, and all parts connected thereto including the valve casing 169, is stopped. The valve 162 is then, as stated above, said to be in its lapped position. The driver may then continue the downward movement of the brake pedal, thereby again opening the valve 162 to increase the brake applying pressure from the vacuum motor 160.

Describing now the operation of the ball check valve 82, in the above described vacuum brake system, should the driver, either accidentally or by design, remove his foot from the brake pedal when the same has been depressed to apply the brakes then the check valve 82 will automatically seat. Explaining this operation, when the brake pedal is released the valve operating member 171 is moved to the right, Figure 11, by the spring 175 and by the brake pedal return spring, not shown, and when the member 171 is moved to the right to the position disclosed in Figure 11, air is admitted to the conduit 159 via openings 187 in the valve casing 169, openings 189 in the valve member 173 and the valve compartments 181 and 183. The spring 175 is not strong enough to so seat the valve member 173 to prevent the air from passing the compartment 181 into the partially evacuated compartment 183. Now, when the air enters the upper portion of the conduit 159 disclosed in Figure 10 the check valve 82 is then subjected to a differential of pressures, for at this time the right side of the valve 82, that is the side facing the valve seat 80, Figure 3, is subjected to a gaseous pressure which is relatively low, for it is to be remembered that at this time the compartment 179 of the vacuum motor 160, and the lower portion of the conduit 159 connecting the same with the valve 76, is partially evacuated.

The check valve 82 is then closed very quickly, not only because of the above described differential of pressures acting on the same, but also because of the force exerted by the spring 162. The check valve 82 having been seated the motor piston 185 remains in its brake applied position despite the release of the brake pedal. It follows therefore that the vacuum brake system disclosed in Figure 10 operates in the same manner as does the hydraulic brake system which is disclosed in Figure 1, that is the brakes are applied when the brake pedal is depressed and remain applied, when the vehicle is on level ground or on an incline or a relatively slight decline, despite the release of the brake pedal. The operation of the mechanism disclosed in Figure 1 is described in greater detail hereinafter.

Assuming the vehicle to be headed to the right with reference to Figure 6, the operation of the switch 100 will now be described. When the vehicle is on level ground, the elements of the pendulum operated mechanism for operating said switch assume the release positions disclosed in Figure 6. In this position of the parts, including the pin 136, the lever 134, the pendulum weight 138, the clip 146 and the spring 150, the latter lies in a line to the left of the pin 136, that is, to the left of dead center. The spring 150 then functions to exert a load upon the clip 146 tending to rotate the same in a counterclockwise direction and to bring the contacts 140 and 142 into engagement with each other. If the vehicle is brought to a stop upon an incline, the lever 134 and its pendulum weight 138 remain in the straight up and down position disclosed in Figure 6, and the casing 132 and the pin secured thereto assume a position such that the spring 150 is even farther from the pin 136 than when the vehicle is on level ground. The degree of incline will in all probability be such as to position the weight 138 in contact with the stop 156. Accordingly, the resulting component of force maintaining the contacts 140 and 142 in engagement is increased. Should the vehicle be stopped upon a decline of sufficient degree to result in the pin 136 being positioned just slightly to the left of the spring 150, as viewed in Figure 6, that is, beyond dead center, then the spring 150 will function to snap the clip 146 clockwise to the right and move the contact 140 away from the contact 142 to open the switch; or should the vehicle be decelerated at or above a certain rate, say five feet per second per second, the same action will occur. It follows therefore that when the brake pedal is released, with the accelerator released to close the switch 98 and the vehicle either positioned or so decelerated as to maintain the switch 100 closed, the brakes will remain applied.

Summing up the features of my invention, there is provided a mechanism for efficiently and effectively controlling the power transmitted from the internal-combustion engine to the propeller shaft of the vehicle. The change-speed transmission cooperates with the fluid clutch, inasmuch as any one of the first, second, high or reverse gear settings of the transmission may be selected to start the vehicle in motion. Should, for example, the vehicle be mired in sand, the transmission may be placed in low gear; however, on dry and level ground the fluid clutch will make possible a starting of the vehicle in high gear without choking the engine. The driver may then leave the transmission in high gear when he coasts the vehicle to a stop, and to prevent creeping of the vehicle after such a stop he has merely to either apply the brakes by depressing and then releasing the brake pedal or disengage the friction clutch by depressing the clutch pedal. It should also be noted that the brake controlling mechanism of my invention functions as a so-called no-roll or no-back device when the vehicle is braked to a stop on an incline: furthermore, the mechanism will function as a no-roll device after the vehicle is braked to a stop on a slight decline, that is, one which is not of sufficient degree to effect an opening of the switch 100.

All aforementioned mechanisms, including the two clutches, the brake operating and controlling means and the transmission, cooperate to control the transmission of power. The friction clutch 12 cooperates with the fluid clutch 10 and the transmission 32, for it is desirable at times, in a vehicle provided with a fluid clutch, to place the transmission in low or second gear. The brake controlling mechanism, including the check valve 72 and the solenoid 74, cooperate with the friction clutch and fluid clutch in preventing the vehicle from rolling backwardly after the vehicle is brought to a stop on certain inclines and cooperate with said clutches in preventing the vehicle from creeping forwardly after the vehicle is brought to a stop on certain other inclines. For should the transmission be left in gear when the vehicle is brought to a stop on an incline of relatively small degree, the then applied brakes will oppose the pulling effect of the fluid clutch to prevent an undesirable forward motion of the vehicle and should the incline be relatively steep the then applied brakes will supplement the pulling effect of the fluid clutch to prevent an undesirable rearward motion. Accordingly, with the mechanism of my invention, the driver, by merely releasing the accelerator and depressing the brake pedal, may stop on any incline without fear of the vehicle moving either forwardly or backwardly. It is not necessary for him to depress the clutch pedal nor maintain the brake pedal depressed, and under most circumstances it is not necessary for him to depress the clutch pedal and shift gears.

Figures 7, 8:
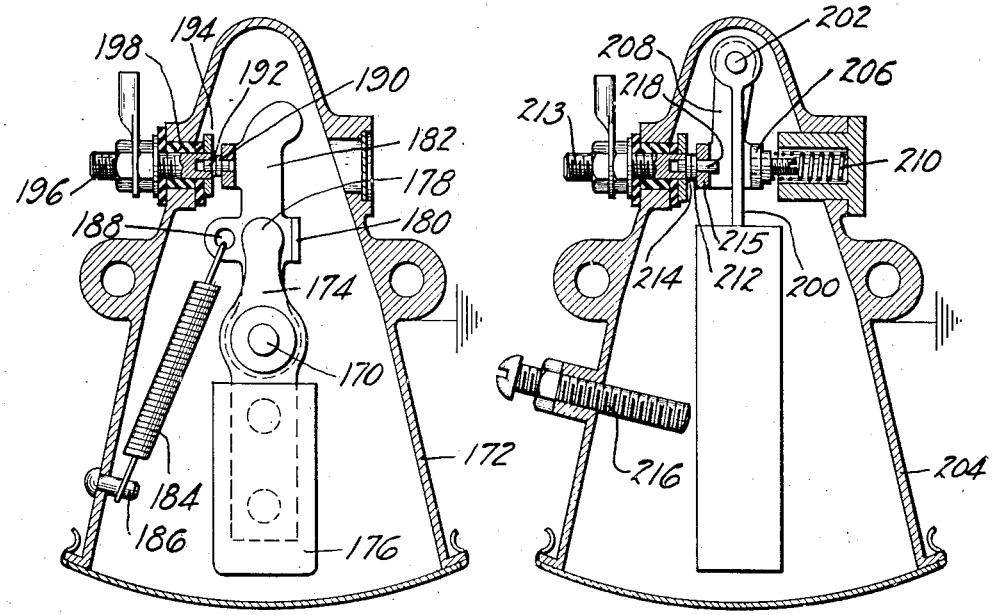
Figures 7, 8 and 9 are sectional views disclosing other embodiments of pendulum operated mechanism for operating a breaker switch.
Figure 9:
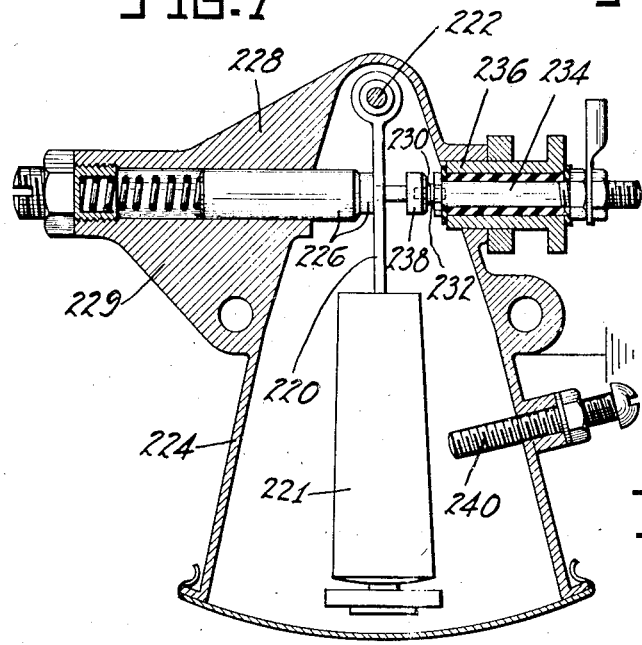

There are disclosed in Figures 7, 8 and 9 other embodiments of pendulum or inertia operated switch mechanism, any one of which may be substituted for the mechanism disclosed in Figure 6.

Referring to Figure 7 and assuming the vehicle headed to the left with reference thereto, a pin 170, extending through a hollow casing 172, serves as a support and fulcrum for a lever 174 having secured thereto at its lower end a weight 176. The casing 172 is secured to the vehicle, and when the latter is at rest on level ground the rounded upper end 178 of the lever 174 is spaced from a tab 180 extending from a lever 182, which is also pivotally mounted, that is, fulcrumed at its lower end, upon the pin 170. A spring 184, secured at one end to a pin 186 fixed to the casing 172 and at its other end to an opening 188 in the lever member, serves to bias the lever 182 to the position disclosed in Figure 7, and in this position maintain an electrical contact member 190 in engagement with a contact member 192 of a breaker switch 194. The members 190 and 192 are secured to the lever 182 and to a pin 196 respectively. This pin, which serves as a conductor, is mounted in the casing 172 and insulated therefrom by a bushing 198. As with the mechanism disclosed in Figure 6, a lead wire is connected to the pin 196 and the casing 172 is grounded. When the vehicle is stopped on a relatively steep decline or is decelerated at a rate of say five or more than five feet per second per second, the resulting relative positions of the lever 182 and the lever 174 are such as to bring the rounded end 178 of the lever 174 into contact with the tab 180 and rotate the lever 182 clockwise against the tension of the spring 184 sufficiently to move the contact 190 away from contact 192 and so break the switch 194 to disable the anti-creep and/or no-back mechanism of the brake system. However, if the vehicle is stopped on level ground or on an incline or is accelerated, the end 178 is farther removed from the tab 180 and the contacts 190 and 192 remain in engagement to make possible an operation of said mechanism.

Describing the inertia or pendulum operated switch mechanism disclosed in Figure 8, and assuming the vehicle is headed to the right with respect thereto, a lever 200 weighted at one of its ends by a pendulum member, is fulcrumed to a pin 202 mounted in a casing 204 fixed to the chassis or a part of the vehicle fixedly secured thereto. When the car is at rest on level ground the lever 200 is spaced from a tab 206 extending from a lever 208 which is also fulcrumed upon the pin 202, and when the car is being accelerated the lever 200 contacts a stop 216 adjustably mounted in the casing 204. However should the car be decelerated at or above a predetermined rate or brought to a stop on a relatively steep decline the lever 200 is moved counterclockwise resulting in a compression of a spring 210. This spring normally serves to force the lever 208 to the left or clockwise thereby forcing electrical contacts 212 and 214 into engagement; however when the spring is compressed by the counter-clockwise moving lever the contacts are separated and the switch opened. The contact 214 is secured to a pin 213 and the contact 212 to a tab 215 extending from the lever 208. The deceleration factor or steepness of the decline necessary to make possible an opening of the switch is determined by the adjustment of the spring 210. The stop 216 serves to prevent the lever 200 from abutting a shank portion 218 of the contact 212 when the car is being accelerated.

There is disclosed in Figure 9 yet another embodiment of inertia operated breaker switch. Describing this unit, and assuming the vehicle headed to the left with respect to this figure, a lever 220, weighted at one of its ends by a pendulum weight 221, is pivotally mounted at its other end upon a pin 222 mounted in a casing 224. A pin 226, slidably mounted in a boss 228 extending from the casing, is urged to the right by a spring 229 to force an electrical contact 230 into engagement with an electrical contact 232 said contacts being secured respectively to the pin 226 and a pin 234 extending through a bushing 236 mounted in the casing 224. When the vehicle is being accelerated, is at rest on level ground or on an incline the lever 220 is spaced from a portion 238 constituting a part of the multi-diametered pin 226; accordingly at this time the spring 229 serves to maintain the contacts 230 and 232 in engagement. Should the car be decelerated at or above a predetermined rate or brought to a stop on a relatively steep decline the relative positions of the lever 220 and casing 224 are then such as to effect a compression of the spring 229 and a consequent separation of the contacts 230 and 232. A stop 240, adjustably mounted in the casing, serves to prevent the lever from contacting the portion 238 should the car be jerked when starting the same in motion. Accordingly this stop, as well as the stops 156 and 216, serve to prevent the lever from damaging the contacts.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a power plant and a propeller shaft drivably connected to the rear wheels of the vehicle, means for controlling the condition of rest or of motion of the vehicle comprising a fluid clutch, a friction clutch and a selective change-speed transmission interconnecting the power plant with the propeller shaft, means for decelerating the vehicle and maintaining the same at a standstill comprising wheel brakes, means including a brake pedal for controlling the operation of said brakes, automatically operable means operative, when the accelerator is released and the vehicle is on an incline of any degree of grade or is at rest on level ground, to maintain the brakes applied once the brake pedal is depressed, and means for disabling said automatically operable means when the vehicle is being decelerated at or above a predetermined rate.

2. A vehicle braking system comprising means under the control of the driver for applying and releasing the brakes and further comprising a spring operated check valve automatically rendered effective to maintain the brakes applied when the accelerator is released and the vehicle is brought to a stop on level ground, power means including a spring and a solenoid for controlling the operation of said check valve, the spring serving to open the valve and the solenoid serving when energized to permit the valve to close, and means for controlling the operation of said power means including an accelerator operated switch and a pendulum operated switch.

3. In an automotive vehicle provided with an accelerator, an internal-combustion engine and a propeller shaft, means for transmitting power from the engine to the propeller shaft including a fluid clutch and a selective change-speed transmission, a vehicle brake system including a brake pedal, means, automatically operable, when the accelerator is released to idle the engine, when the transmission is in gear and when the vehicle is stopped on either an incline of any degree of grade or on level ground, to maintain the brakes applied and thus either supplement the fluid clutch as a means for preventing the vehicle from rolling backward if the vehicle is located on an incline or if the vehicle is located on level ground prevent a forward movement of the vehicle as a result of the driving effect of the fluid clutch, together with means for controlling the operation of said automatically operable means.

4. A vehicle braking system comprising means under the control of the driver for applying and releasing the brakes and further comprising a spring operated check valve automatically rendered effective to maintain the brakes applied when the accelerator is released and the vehicle is brought to a stop on level ground, power means including a spring and a solenoid for controlling the operation of said check valve the spring serving to open the valve and the solenoid serving when energized to permit the valve to close, and means for controlling the operation of said power means including an accelerator operated switch, a pendulum operated switch, and means for controlling the operation of said latter switch including a pendulum weight and spring operated lever member positioned, when the vehicle is on level ground or is on an incline or is decelerating at or below a predetermined rate, to effect a closing of the switch to effect an energization of the solenoid and positioned, when the vehicle is decelerating at or above the aforementioned predetermined rate, to effect an opening of the switch to effect a deenergization of the solenoid and permit the spring to open the check valve.

ALLAN C. CHAMBERS.